(12) United States Patent
Castelnuovo

(10) Patent No.: US 8,406,551 B2
(45) Date of Patent: Mar. 26, 2013

(54) RENDERING METHOD OF AN EDGE OF A GRAPHICS PRIMITIVE

(75) Inventor: Andrea Castelnuovo, Paderno D'Adda (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 361 days.

(21) Appl. No.: 12/782,486

(22) Filed: May 18, 2010

(65) Prior Publication Data

US 2010/0296750 A1 Nov. 25, 2010

(30) Foreign Application Priority Data

May 19, 2009 (IT) .............................. MI2009A0876

(51) Int. Cl.
*G06K 9/68* (2006.01)
(52) U.S. Cl. ...................................... 382/266
(58) Field of Classification Search .................. 382/229
See application file for complete search history.

(56) References Cited

U.S. PATENT DOCUMENTS

| | | | | |
|---|---|---|---|---|
| 5,287,442 A * | 2/1994 | Alcorn et al. | ................. | 345/443 |
| 5,333,250 A * | 7/1994 | Staley et al. | ................. | 345/443 |
| 5,487,142 A * | 1/1996 | Nakayama et al. | ........... | 345/443 |
| 5,815,162 A * | 9/1998 | Levine | ........................... | 345/443 |
| 6,947,057 B2 * | 9/2005 | Nelson et al. | ................. | 345/611 |
| 7,187,381 B2 * | 3/2007 | Nishi | ............................. | 345/443 |

OTHER PUBLICATIONS

"Anti-Aliased Line Drawing," ECE Illinois, retrieved on Jan. 25, 2010 from http://courses.ece.illinois.edu/ece390/archive/archive-f2000/mp/mp4/anti.htm, 2000, 5 pages.
Foley et al. (eds.), *Computer Graphics: Principles and Practice*, 2$^d$ ed., Addison Wesley, Boston, 1996, pp. 72-79. XP-002565152 (8 pages).
Foley et al. (eds.), *Computer Graphics: Principles and Practice*, 2$^d$ ed., Addison Wesley, Boston, 1996, pp. 132-143. XP-002565153 (12 pages).
Foley et al. (eds.), *Computer Graphics: Principles and Practice*, 2$^d$ ed., Addison Wesley, Boston, 1996, pp. 835-839. XP-002565129 (5 pages).
Italian Search Report and Written Opinion, for Application No. IT MI20090876, mailed Feb. 8, 2010, 9 pages.
Pitteway et al., "Bresenham's Algorithm with Grey Scale," *Communications of the ACM* 23(11):625-626, 1980. (2 pages).

* cited by examiner

*Primary Examiner* — Bhavesh Mehta
*Assistant Examiner* — Utpal Shah
(74) *Attorney, Agent, or Firm* — Seed IP Law Group PLLC

(57) ABSTRACT

A method for rendering an edge of a graphics primitive to be displayed on a screen. Such edge has an inclination relative to a reference direction of the screen. The method includes the steps of: calculating, based on the inclination of the edge, an error coefficient representative of the distance of the edge from a center of a pixel of the screen; and associating a transparency coefficient to the pixel, based on the calculated error coefficient.

40 Claims, 5 Drawing Sheets

RENDERING METHOD OF AN EDGE OF A GRAPHICS PRIMITIVE

BACKGROUND

1. Technical Field

The present disclosure relates to anti-aliasing techniques for computerized graphics, and particularly to a rendering method of an edge of a primitive.

2. Description of the Related Art

Computerized graphics is the technique of generating images on a hardware device, such as, for example, a display or screen, via computer. The generation of objects to be represented on a displaying device is commonly defined as rendering.

In computerized graphics, each object to be rendered is composed of a number of primitives.

A primitive is a simple geometric entity, such as, for example, a point, a line, a triangle, a rectangle, a polygon or a high-order surface.

The rendering of a primitive results to be quite critical as regards the rendering of each edge (edge or outline) of the same primitive, in which the need is strongly felt of minimizing a visual effect termed the aliasing effect.

As known, the aliasing effect consists in the so-called jagged or dashed effect of an edge of a primitive, which typically occurs when rendering an edge which results to be inclined relative to the vertical or horizontal edge of the displaying screen. In fact, a rendering method (simplest approach) consists in assigning no colors to the screen pixels which are not passed through by any edges, and in assigning the same color to all the screen pixels which are passed through by the same edge. This approach does not properly take into consideration the fact that a pixel can be partially covered by an edge (in the case where, for example, the pixel is passed through by the edge of the same primitive), and has as a consequence an abrupt color change between the primitive (therefore, the object) to be rendered on the scene and the background of the same scene, exactly due to the production of the aliasing effect.

Further approaches corresponding to as many rendering methods, with so-called anti-aliasing techniques, try to reduce (or shade) the aliasing effect by facing this problem.

Known rendering methods with anti-aliasing technique are, for example, the super-sampling method, or FSAA (Full Scenes Anti-Aliasing), and the multi-sampling method, or MSAA (Multi-Sampling Anti-Aliasing).

The FSAA method processes an image to a higher resolution, which is then scaled to the screen final resolution. For example, the 4×FSAA method performs a division of a screen pixel into four sub-pixels, and subsequently it checks how many of the four sub-pixels are covered by an edge of a primitive. According to the number of edge-covered sub-pixels, the method will assign a transparency coefficient to the original pixel, which corresponds to the cover percentage of the selected pixel from distinct coverage gradations referred to the number of sub-pixels belonging to the edge of the primitive (25% coverage, 1 covered sub-pixel; 50% coverage, 2 covered sub-pixels; 75% coverage, 3 covered sub-pixels; 100% coverage, 4 covered sub-pixels) and a non-coverage gradation (0%, not colored pixel). In this manner, it is possible to reduce the aliasing effect by introducing a shading effect of the so-called edge pixels by using a gray scale.

The MSAA method also, alternative to the method FSAA, processes an image to a higher resolution, which is subsequently scaled to the screen final resolution, except that it employs a single texture sample for each sub-pixel, thus reducing the required band compared to the FSAA method.

The above-mentioned rendering methods with anti-aliasing techniques are not free from drawbacks.

In fact, both the FSAA and MSAA methods require a processing of the image which is to be repeated as many times as the sampling sub-pixels are, and this leads to a drawback from a computational point of view. Furthermore, image processing in the FSAA method involves, for each sampling sub-pixel, reading a texture (image) from the memory, corresponding to a transparency coefficient, and the application of the texture to the relative single sub-pixel thus causing, in effect, a high and quite disadvantageous band occupancy.

BRIEF SUMMARY

An object of the present disclosure is to devise and to provide a rendering method with anti-aliasing technique which is alternative to those of the above-described known art, and which allows at least partially overcoming the drawbacks reported herein before with reference to the prior art.

In an embodiment, a rendering method of an edge of a graphics primitive to be displayed on a screen, said edge having a determined inclination relative to a reference direction of the screen, comprises steps of: calculating, based on the determined inclination of said edge, an error coefficient representative of the distance of said edge from a center of a pixel of the screen; and associating a transparency coefficient to said pixel, based on said error coefficient calculated. In an embodiment, the associating step of a transparency coefficient comprises the calculating step of said transparency coefficient based on said error coefficient calculated. In an embodiment, the calculating step comprises a step of employing said error coefficient calculated as the shading function coefficient of the alpha channel of said pixel, said shading function coefficient generating said transparency coefficient. In an embodiment, the associating step of a transparency coefficient comprises a selecting step of said transparency coefficient from a plurality of transparency coefficients, based on said error coefficient calculated. In an embodiment, the selecting step of a transparency coefficient comprises the indexing step, by said error coefficient calculated, of a memory area so arranged as to store a linear gradient of transparency coefficients values.

In an embodiment, a graphics module, for rendering an edge of a graphics primitive to be displayed on a screen, comprises: a geometry processing module; a rasterizer module operatively associated to said geometry processing module; a pixel processing module operatively associated to said rasterizer module, said rasterizer module being configured to implement embodiments of the rendering methods disclosed herein.

In an embodiment, a graphics system comprises: a central control unit comprising a central processing unit; a memory module operatively associated to said one central control unit; a displaying screen operatively connected to the central control unit; a graphics module operatively associated to said central processing unit, said graphics module being configured to implement embodiments of the rendering methods disclosed herein. In an embodiment, the graphics system further comprises a mass memory storage device operatively connected to the central control unit, said mass memory storage device being arranged for the storage of images to be represented on the displaying screen. In an embodiment, the graphics system further comprises a positioning module operatively connected to the central control unit, said positioning module being arranged information to provide to the central control unit which is representative of the position of the graphics system. In an embodiment, the graphics system further comprises an application module operatively connected to said graphics module, said application module being configured to provide information to the graphics module which is representative of the scene to be rendered. In an embodiment, the graphics system further comprises a frame buffer operatively connected to said graphics module, said frame buffer being arranged to store information representative of the color of each pixel of the displaying screen. In an embodiment, the graphics system belongs to the group consisting of: satellite navigator, set-top box, mobile telephone, palmtop PDA, terrestrial digital receiver, DVIX player, MP3 player, personal computer, PS3 playstation.

In an embodiment, a method comprises, using at least one processing device to: calculate, based on an inclination of an edge of a graphics primitive relative to a reference direction of a screen, an error coefficient representative of a distance of said edge from a center of a pixel of the screen; and associate a transparency coefficient to said pixel, based on said error coefficient calculated. In an embodiment, the associating step of a transparency coefficient comprises calculating said transparency coefficient based on said error coefficient calculated. In an embodiment, calculating the transparency coefficient comprises employing said error coefficient calculated as a shading function coefficient of an alpha channel of said pixel. In an embodiment, the associating step of a transparency coefficient comprises a selecting step of said transparency coefficient from a plurality of transparency coefficients, based on said error coefficient calculated. In an embodiment, the selecting step of a transparency coefficient comprises an indexing step, by said error coefficient calculated, of a memory area so arranged as to store a linear gradient of transparency coefficients values.

In an embodiment, a graphics device comprises: a geometry processing module; a rasterizer coupled to the geometry processing module and configured to: calculate, based on an inclination of an edge of a graphics primitive relative to a reference direction, an error coefficient representative of a distance of the edge from a center of a pixel; and associate, based on the calculated error coefficient, a transparency coefficient to said pixel; and a pixel processing module coupled to the rasterizer. In an embodiment, the raterizer is configured to calculate the transparency coefficient based on the calculated error coefficient. In an embodiment, calculating the transparency coefficient comprises employing the calculated error coefficient as a shading function coefficient of an alpha channel of the pixel. In an embodiment, the raterizer is configured to select, based on the calculated error coefficient, the transparency coefficient from a plurality of transparency coefficients. In an embodiment, the graphics device further comprises a memory storing a linear gradient of transparency coefficient values, wherein the raterizer is configured to select the transparency coefficient using an index of the stored gradient of transparency coefficient values to a set of calculated error coefficients.

In an embodiment, a graphics system comprises: a memory; and a graphics rendering device configured to: calculate, based on an inclination of an edge of a graphics primitive relative to a reference direction, an error coefficient representative of a distance of the edge from a center of a pixel; and associate, based on the calculated error coefficient, a transparency coefficient to said pixel. In an embodiment, the graphics system comprises a central control unit, the graphics rendering device is part of the central control unit and the memory is coupled to the central control unit. In an embodiment, the graphics system further comprises a display coupled to the central control unit. In an embodiment, the central control unit comprises a central processing unit coupled to the graphics rendering unit. In an embodiment, the graphics system further comprises a mass memory storage device operatively connected to the central control unit, said mass memory storage device being arranged for the storage of images to be represented on a displaying screen. In an embodiment, the graphics system further comprises a positioning module operatively connected to the central control unit, said positioning module being arranged information to provide to the central control unit which is representative of a position of the graphics system. In an embodiment, the graphics system further comprises an application module operatively connected to said graphics rendering device, said application module being configured to provide information to the graphics rendering device which is representative of a scene to be rendered. In an embodiment, the graphics system further comprises a frame buffer operatively connected to said graphics rendering device, said frame buffer being arranged to store information representative of a color of each pixel of a display. In an embodiment, the graphics system is one or more of: a satellite navigator; a set-top box; a mobile telephone; a palmtop PDA; a terrestrial digital receiver; a DVIX player; an MP3 player; a personal computer; and a gaming machine. In an embodiment, the graphics system is a PS3 playstation.

In an embodiment, a computer readable medium's contents cause at least one controller to perform a method, the method comprising: calculating, based on an inclination of an edge of a graphics primitive relative to a reference direction, an error coefficient representative of a distance of the edge from a center of a pixel; and associating, based on the calculated error coefficient, a transparency coefficient to the pixel. In an embodiment, the associating comprises calculating the transparency coefficient based on the calculated error coefficient. In an embodiment, calculating the transparency coefficient comprises employing the calculated error coefficient as a shading function coefficient of an alpha channel of the pixel. In an embodiment, the associating comprises selecting, based on the calculated error coefficient, the transparency coefficient from a plurality of transparency coefficients. In an embodiment, the selecting comprises using an index based on the calculated error coefficients to retrieve the transparency coefficient from a set of gradient of transparency coefficient values stored in a memory.

In an embodiment, a device comprises: means for calculating, based on an inclination of an edge of a graphics primitive relative to a reference direction, an error coefficient representative of a distance of the edge from a center of a pixel; and means for associating, based on the calculated error coefficient, a transparency coefficient to the pixel. In an embodiment, the means for associating is configured to calculate the transparency coefficient based on the calculated error coefficient. In an embodiment, calculating the transparency coefficient comprises employing the calculated error coefficient as a shading function coefficient of an alpha channel of the pixel. In an embodiment, the means for associating is configured to select, based on the calculated error coefficient, the transparency coefficient from a plurality of transparency coefficients. In an embodiment, the device further comprises a memory storing a linear gradient of transparency coefficient values, wherein the means for associating is configured to select the transparency coefficient using an index of the stored gradient of transparency coefficient values to a set of calculated error coefficients. In an embodiment, the device is operable as one or more of the following: a satellite navigator; a set-top box; a mobile telephone; a palmtop PDA; a terrestrial digital receiver; a DVIX player; an MP3 player; a personal computer; and a gaming machine.

In an embodiment, a rendering method of an edge of a graphics primitive to be displayed on a screen, said edge having a determined inclination relative to a reference direction of the screen, comprises steps of: calculating, based on the determined inclination of said edge, an error coefficient representative of the distance of said edge from a center of a pixel under processing along a first direction (x) and a second direction (y) of the screen; generating, by means of a linear rasterization algorithm, the increased coordinates of the pixel along said first direction (x) and said second direction (y), respectively; generating, based on linear coefficients and said increased coordinates of the pixel (P1) under processing, an index to a memory area arranged to store a linear gradient of a plurality of transparency coefficients; selecting, on the basis of said index, a transparency coefficient from a plurality of transparency coefficients; and associating said transparency coefficient to said pixel. In an embodiment, the calculating step comprises a step of employing said error coefficient calculated as the shading function coefficient of the alpha channel of said pixel, said shading function coefficient generating said transparency coefficient. In an embodiment, the selecting step of a transparency coefficient comprises the step of indexing, by said error coefficient calculated, of the memory area arranged to store the linear gradient of transparency coefficients values.

In an embodiment, a graphics module for rendering an edge of a graphics primitive to be displayed on a screen, comprises: a geometry processing module; a rasterizer module operatively associated to said geometry processing module; a pixel processing module operatively associated to said rasterizer module, said pixel processing module being configured to implement embodiments of rendering methods disclosed herein.

In an embodiment, a graphics system comprises: a central control unit comprising a central processing unit; a memory module operatively associated to said central control unit; a displaying screen operatively connected to the central control unit; a graphics module operatively associated to said central processing unit, said graphics module being configured to implement embodiments of rendering methods disclosed herein. In an embodiment, the graphics system further comprises a mass memory storage device operatively connected to the central control unit, said mass memory storage device being arranged for the storage of images to be represented on the displaying screen. In an embodiment, the graphics system further comprises a positioning module operatively connected to the central control unit, said positioning module being arranged to provide information to the central control unit which is representative of the position of the graphics system. In an embodiment, the graphics system further comprises an application module operatively connected to said graphics module, said application module being configured to provide information to the graphics module which is representative of the scene to be rendered. In an embodiment, the graphics system further comprises a frame buffer operatively connected to said graphics module, said frame buffer being arranged to store information representative of the color of each pixel of the displaying screen. In an embodiment, the graphics system is one or more of a satellite navigator, set-top box, mobile telephone, palmtop PDA, terrestrial digital receiver, DVIX player, MP3 player, personal computer, and PS3 playstation.

BRIEF DESCRIPTION OF THE SEVERAL VIEWS OF THE DRAWINGS

Further characteristics and advantages of the rendering method according to embodiments will result from the description reported below of example embodiments, given by way of non-limiting example, with reference to the annexed Figures, in which.

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" "according to an embodiment" or "in an embodiment" and similar phrases in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
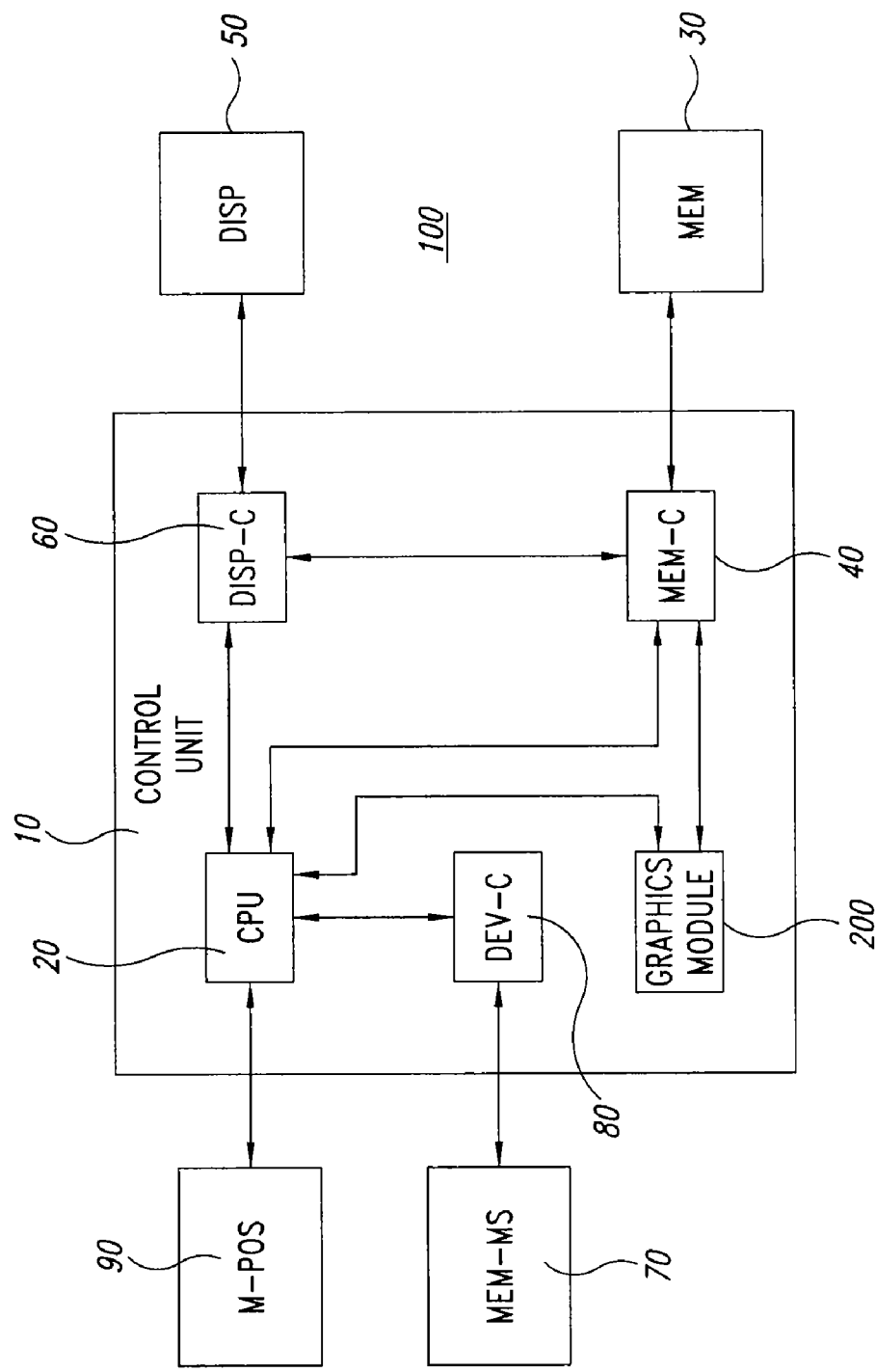
FIG. 1 schematically illustrates an example of graphics system adapted to implement the rendering method according to an embodiment.

FIG. 1 shows a graphics system 100 in accordance with an embodiment, including a rendering graphics module 200, or also graphics pipeline.

The graphics system 100 of FIG. 1 is, for example, a satellite navigation apparatus of the GPS (Global Positioning System) type, or simply known as satellite navigator, but in accordance with other embodiments, it can be another graphics system, such as a mobile telephone, a palmtop (Personal Digital Assistant), a coding/decoding apparatus for digital television (set-top box), a multimedial device with a screen of the VGA type (terrestrial digital receiver, DVIX players or MP3 player), an electronic computer (for example, a personal computer), a playstation (for example, PS3), and so on.

The satellite navigation apparatus 100 comprises a central control unit 10 comprising, in turn, a central processing unit 20 (CPU), for example, a microprocessor or a microcontroller.

The satellite navigation apparatus 100 further comprises a main system memory module 30 (MEM), for example, a memory module of the DDR-SDRAM or DDRII RAM type, operatively connected to the central control unit 10.

More in detail, in the illustrated embodiment the main system memory module 30 results to be operatively connected to a first control module 40 (MEM-C) of the main system memory module 30 with which the central control unit 10 results to be provided, and having the function of an interface between the central processing unit 20 and the main system memory module 30. Particularly, the first control module 40 is configured to synchronize the different communication protocols employed in the data bus of the central control unit 10 and in the main system memory module 30.

The satellite navigation apparatus 100 further comprises a displaying screen or display 50 (DISP) operatively connected to the central control unit 10.

The displaying screen or display 50 results to be arranged to display images such as, for example, maps or road maps for the satellite navigation.

The displaying screen 50 results to be operatively connected to a second control module 60 (DISP-C) of the displaying screen 50 with which the central control unit 10 results to be provided, and having the function of an interface between the central processing unit 20 and the displaying screen 40. Particularly, a function of the second control module 60 is the synchronization between the data flow frequency from the central processing unit 10 and the refresh frequency of the displaying screen 50.

Furthermore, the second control module 60 results to be operatively connected to the first control module 40 to be consequently operatively associated to the main system memory module 30 in order to acquire information to be provided to the displaying screen or display 50.

The satellite navigation apparatus 100 further comprises a mass memory device 70 (MEM-MS) operatively connected to the central control unit 20, and arranged for the storage of images representative of maps or road maps to be represented, by the control unit 20, onto the displaying screen 50, and other information such as, for example, the application or data relating to the latest satellite navigation performed by the apparatus 100.

The mass memory device 70 results to be operatively connected to a third control module 80 (DEV-C) of the mass memory device 70 with which the central control unit 10 results to be provided, and having the function of an interface between the central processing unit 20 and the mass memory device 70.

The mass memory device 70 is a device arranged for the storage of data such as, for example, a CD-ROM, a digital board of the SDH type, or a hard-disk, associable to a respective data reader with which the satellite navigation apparatus 100 results to be provided, or connectable directly to the third control module 80.

The satellite navigation apparatus 100 further comprises a positioning module 90 (M-POS), operatively associated to the central control unit 10 to provide data, to the central processing unit 20, which are representative of the position of the satellite navigation apparatus 100. The positioning module 90 is, for example, a satellite module or receiver of the GPS type.

The central control unit 10 further comprises a rendering graphics module 200, or simply graphics module, which results to be operatively connected to and controlled by the central processing unit 20.

The graphics module 200 is configured to implement a set of graphics-type functions to render a graphics scene (for example, a road map), the description of which is received in input by the central processing unit 20 through the mass memory storage device 70, and then displayed on the displaying screen 50 of the satellite navigation apparatus 100.

The graphics module 200 results to be also operatively connected to the first control module 40 to permit access the main system memory module 30 upon both reading and writing during the implementation of the set of graphics-type functions to render the graphics scene.

In an embodiment, the graphics module 200 is a graphics engine so configured as to render images, thus relieving the central processing unit 20 from additional work loads. For the purposes of the present disclosure, by graphics engine is meant a device capable of hardware or software rendering not by means of execution by the central processing unit 20 but by means of execution by another co-processor such as, for example, a digital signal processor DSP. The term "graphics accelerator" or "graphics co-processor", also generally employed in the computerized graphics field, are completely equivalent to the term graphics engine.

Alternatively, the graphics module 200 can be a graphics processing unit GPU, in which the rendering functions are performed based on software instructions performed by a dedicated processor, such as a DSP, and based on hardware instructions performed by a specifically designed hardware logic. In accordance with a further embodiment, some or all of the rendering functions are performed by the central processing unit 20.

Figure 2:
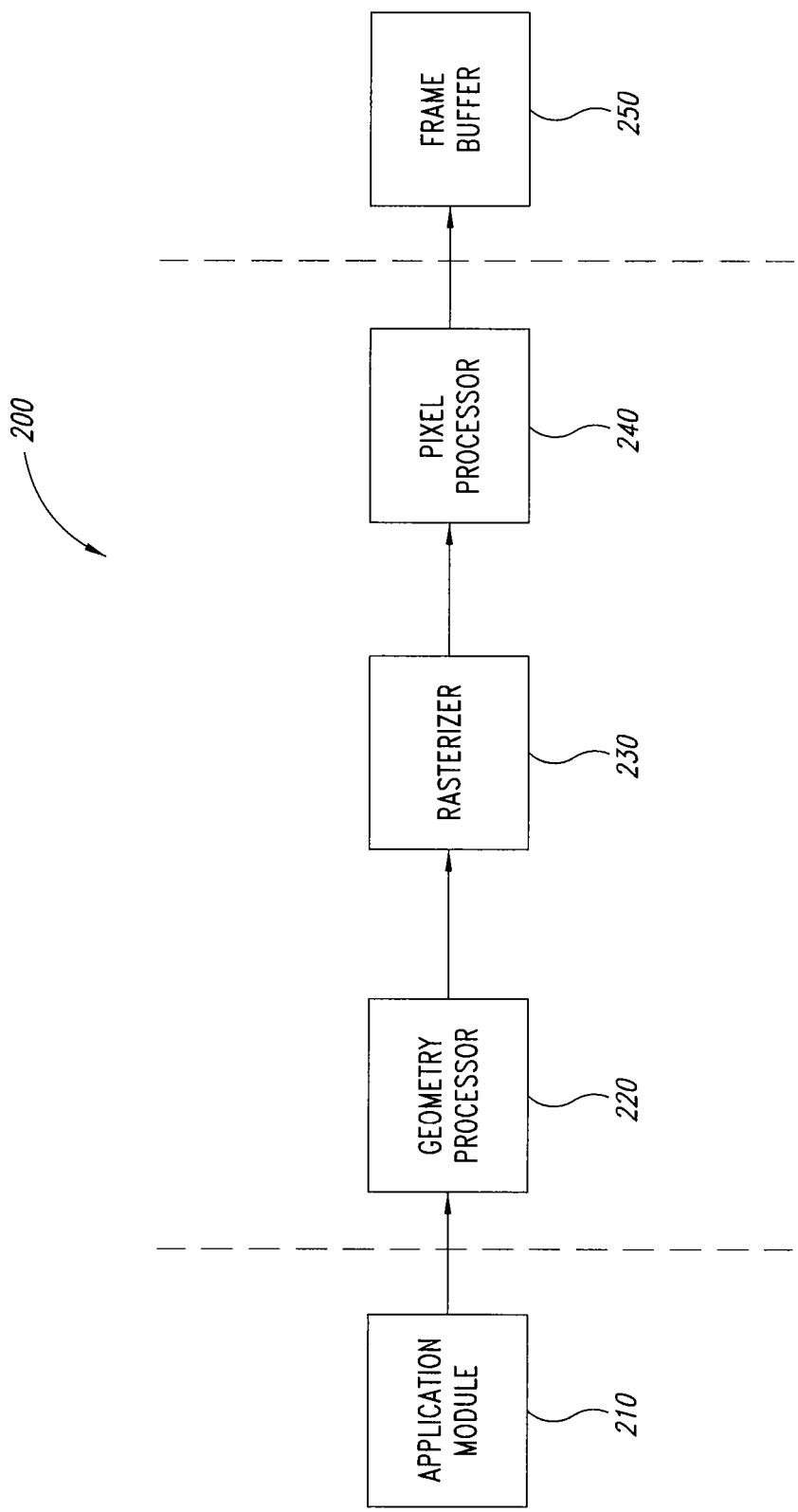
FIG. 2 illustrates a graphics module which can be employed in the graphics system of FIG. 1 to implement the rendering method according to an embodiment.

FIG. 2 shows a block diagram of an embodiment of a graphics module 200 or graphics pipeline, suitable for use, for example, in the embodiment of FIG. 1. Particularly, the graphics module 200 is so configured as to render images on the displaying screen 50 of the satellite navigation apparatus 100 by implementing a rendering method, an example of which will be described herein below.

The graphics module 200 comprises a geometry processing module 220 (geometry stage), also known as Tnl module (by the English acronym, Transform and Lighting stage), a rasterizer module 230, and a pixel processing module 240.

The geometry processing module 220, examples of which are known to those of ordinary skill in the graphics field, is configured to receive in input information representative of the scene to be rendered which are provided by an application module 210, shown for the sake of clarity in FIG. 2, but not typically being part of the graphics module 200.

The application module 210, examples of which are known to those skilled in the art, results to be comprised in the satellite navigation apparatus 100, and it is so arranged as to receive information by the central processing unit 20 which is representative of the satellite navigation status such as, for example, the position of the satellite navigation apparatus 100 and the map, to be displayed on the screen, corresponding to the position, and to provide in output information which is representative of the objects (for example, lines) of the road map to be rendered and of the parameters and/or commands required to render them.

Referring back to the geometry processing module 220, it is arranged to perform a geometric transformation operation of each line of the road map received by the application module 210 into a plurality of primitives, for example, triangles. The geometry processing module 220 is configured to provide in output data representative of each triangle (for example, the coordinates of the vertexes).

As defined above, a primitive is a simple geometric entity such as, for example, a point, line, triangle, square, polygon, or a high-order surface. Reference is often made to triangles, which can be univocally defined by the coordinates of the vertexes, without using other types of primitives.

Figure 3:
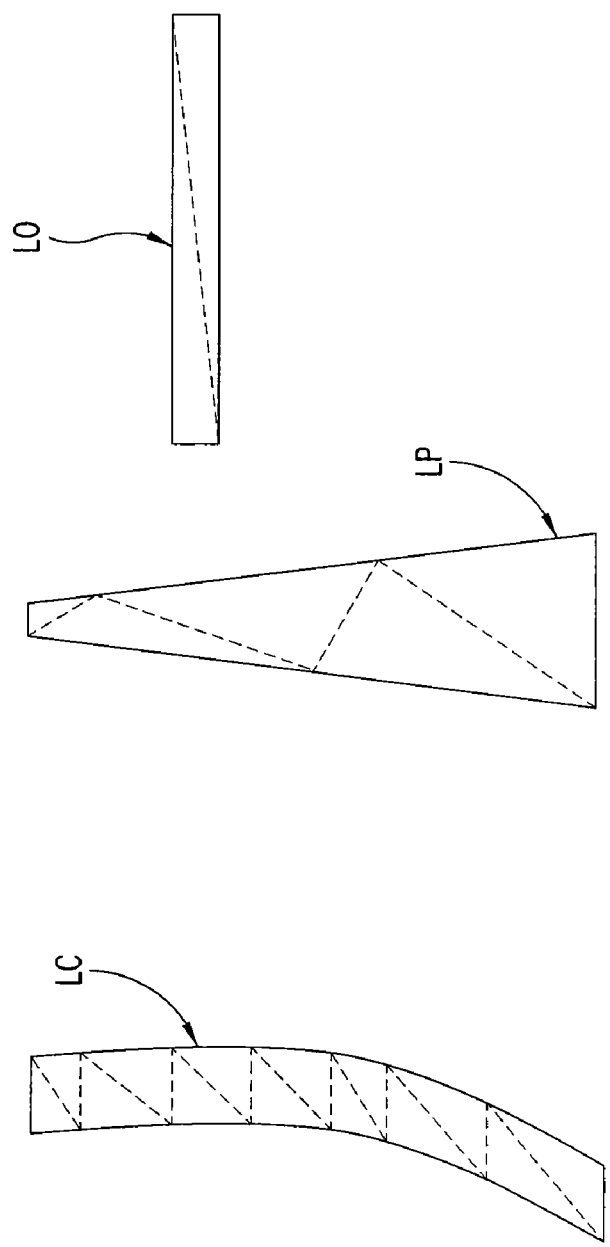
FIG. 3 schematically illustrates example geometric entities that may be processed by the rendering method according to an embodiment.

With particular reference now to FIG. 3, a line L of a road map, as provided by the geometry processing module 220, can be, for example, a curved line LC, a perspective line LP (of a typically trapezoidal shape), or a horizontal line LO (typically, of a rectangular shape).

Each of the above-mentioned lines (LC, LP, LO) can be divided into a plurality of primitives of the triangular type by the geometric transformation operation performed by the geometry processing module 220. It shall be noted that each primitive of the triangular type comprises three sides, which are represented in the Figure according to the following criterion: a side of a triangle falling within the line is represented with a dashed line, a side matching with the edge (border edge) or an edge portion of the line is represented with a solid line. It is pointed out that the better approximation of each line with the relative plurality of triangles is higher when the number of triangles is higher.

The rasterizer module 230 is configured to receive in input the data representative of each triangle received by the geometry processing module 220 and to provide in output, for each edge of a triangle, the attributes of each pixel that are necessary to render the respective edge. Such attributes comprise, for example, the single pixel coordinates and the transparency or anti-aliasing coefficient to be applied to the same pixel. It is pointed out that the anti-aliasing coefficient is generally determined for the triangle edges which match with the line edges (solid edge in FIG. 3) and generally not determined for the triangle edges within the line (dashed edge in FIG. 3).

Therefore, the rasterizer module 230 results to be configured to perform a rendering method of an edge of a graphics primitive according to an example embodiment, which, as already stated above, will be described herein below.

The pixel processing module 240 is configured to process the attributes of each pixel which are received by the rasterizer module 230 by associating a definitive color to each pixel to be assigned to the same pixel on the displaying screen 50. Particularly, the pixel processing module 240 results to be arranged to write the piece of information in the frame buffer 250 which is representative of the color of each pixel of the displaying screen 50. It shall be noted that the frame buffer 250 is a memory area shown for sake of clarity in FIG. 2, however it is typically not part of the graphics module 200.

The frame buffer 250, not shown in FIG. 1, is arranged to be read by the second control module 60, which will provide the stored information of the frame buffer 250 to the displaying screen 50 for the switching on of the pixels, in order to obtain the definitive displaying of the rendered road map.

Figure 4:
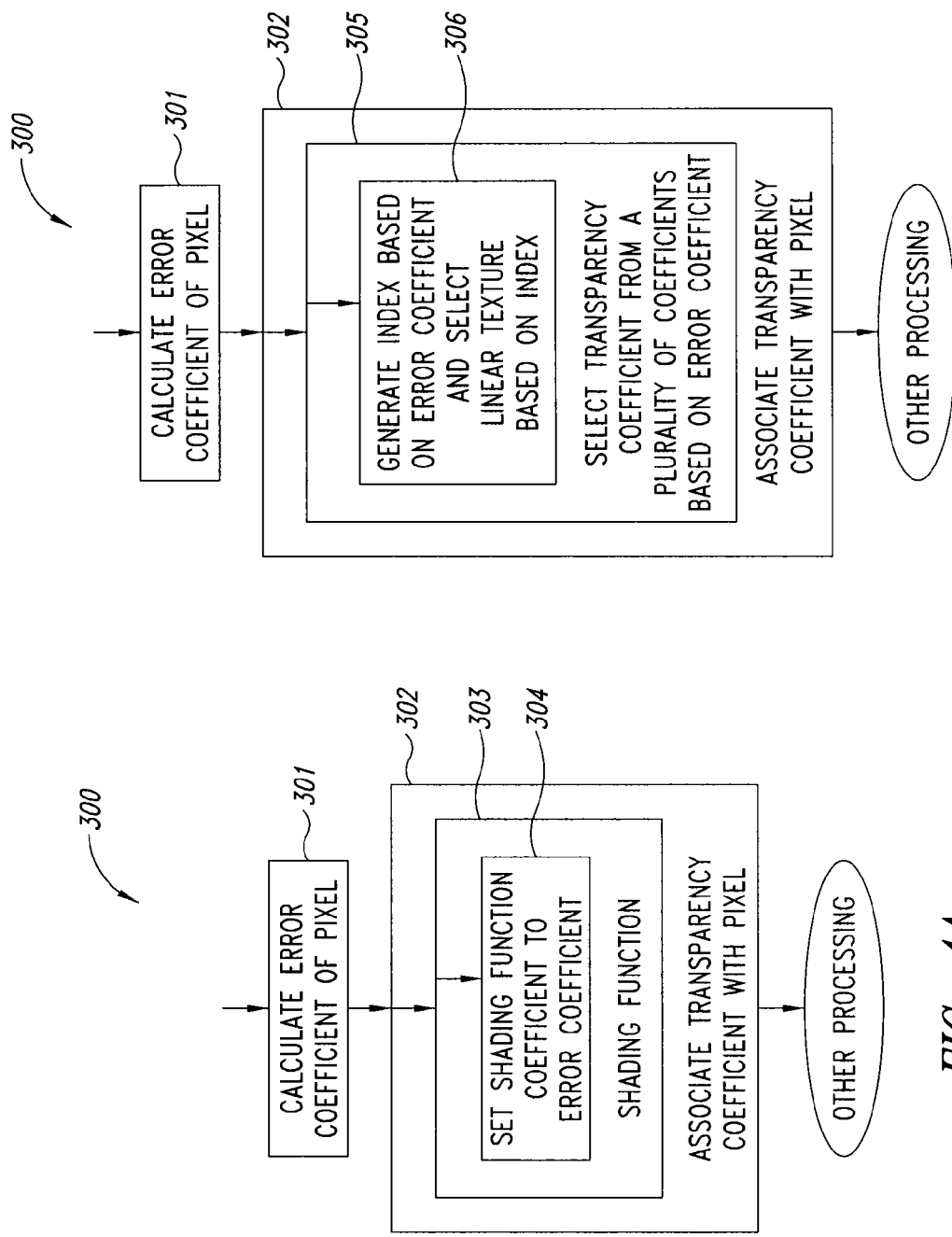
FIG. 4A schematically illustrates a block diagram representative of the rendering method according to an embodiment.
FIG. 4B schematically illustrates a block diagram representative of the rendering method according to another embodiment.

With reference to FIG. 4A, an embodiment of a rendering method 300 of an edge of a graphics primitive to be displayed on a screen according to an example embodiment is now described. In an embodiment, the rendering method is implemented by the graphics module 200, and particularly by the rasterizer module 230.

It is pointed out that an embodiment of the rendering method, being directed to reducing the aliasing effect, is mainly directed to rendering an inclined edge relative to a reference (horizontal or vertical) direction of the screen, i.e., having a determined inclination relative to the reference direction.

Particularly, the rendering method 300 implements a rasterizing algorithm to determine which pixels of the screen are to be switched on, for example, the Bresenham's algorithm.

The rasterization Bresenham's algorithm, hereinafter also simply algorithm, can be described with particular reference to FIG. 5, in which a portion of a displaying screen is illustrated, which is indicated for the sake of simplicity again with the numeral reference 50, on which an edge E of a graphics primitive to be rendered is plotted.

The algorithm considers the starting point of an edge of a graphics primitive as corresponding to the center of a start pixel, and the end point of the same edge as corresponding to a center of an end pixel.

Figure 5:
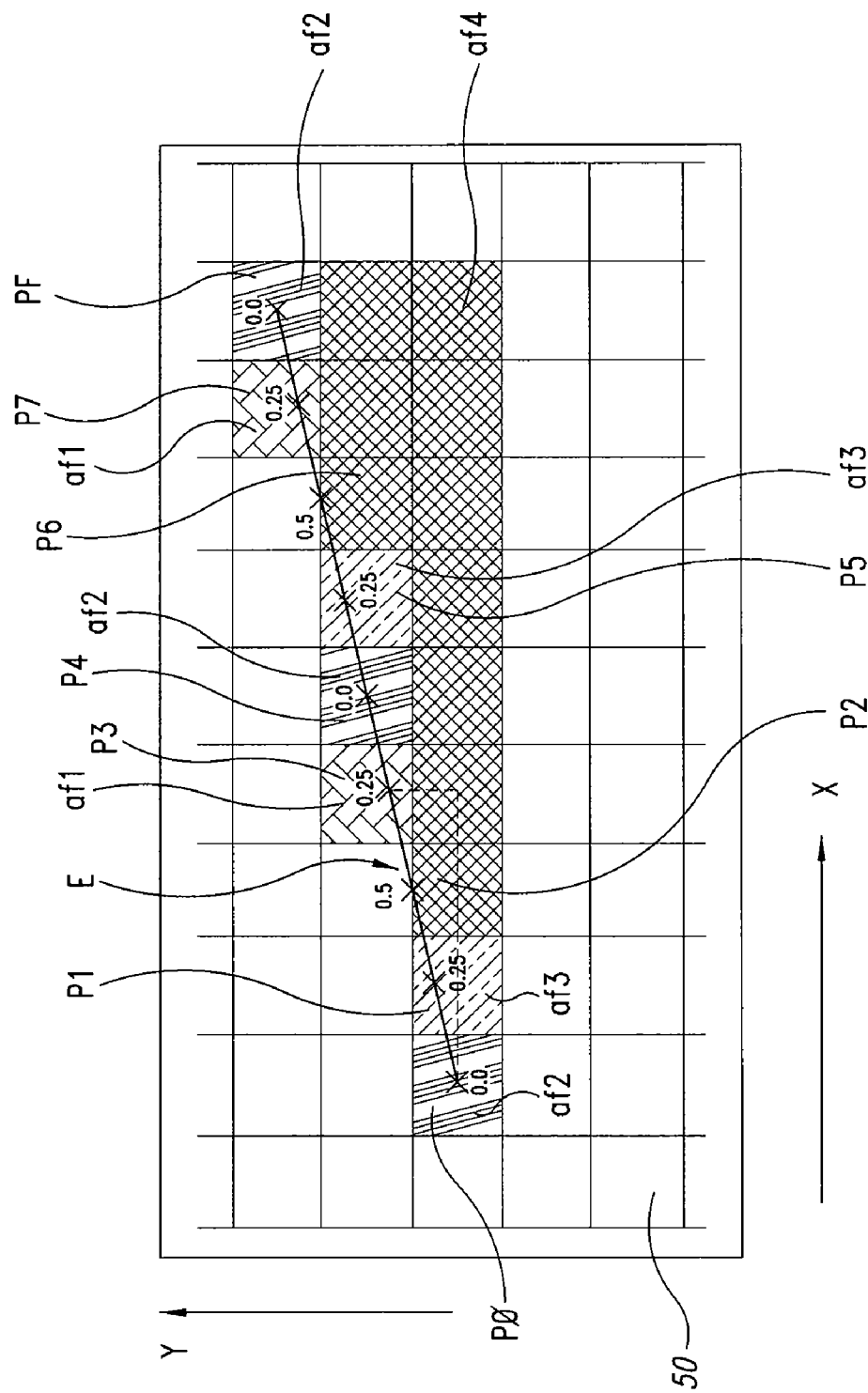
FIG. 5 schematically illustrates an example portion of a displaying screen on which a graphics entity to be rendered by the method according to an embodiment is represented.

In the example of FIG. 5, the starting point of the edge E is considered as corresponding to the center of a start pixel P0 having coordinates x0, y0. The arrival point of the edge E corresponds to the center of an end pixel PF having coordinates x1 and y1.

The equation of the ideal straight line passing through the starting point (x0, x0) and the arrival point (X1, Y1) is as follows:

$$y - y0 = \frac{(y1 - y0)}{(x1 - x0)} \cdot (x - x0) \qquad (1)$$

in which the amount $$\frac{(y1 - y0)}{(x1 - x0)},$$

as known, indicates the straight line slope.

The straight line slope represents the determined inclination of the edge E which depends, as known, on the starting point P1 and the end point PF coordinates of the edge E.

The algorithm assumes that the start pixel P1 has center with coordinates y0=0 and y0=0. Consequently, in the example of FIG. 5, the end pixel PF has center with coordinates x1=8 and y1=2 relative to the origin (center of the start pixel P1).

The Bresenham's algorithm calculates, for each pixel, the distance, along the direction y, between the inclined edge and the center of the pixel being processed. Such distance is representative of an error coefficient made by the algorithm in selecting to switch a determined pixel on in order to render an edge with a determined inclination.

Once the error coefficient is known, the algorithm is capable of increasing the coordinate x value and/or the coordinate y value, then going on to switch a pixel successive to the one being processed on, in order to switch on those pixels which follow at the best the ideal straight line corresponding to the edge to be rendered.

The Bresenham's algorithm considers each pixel as a square with side equal to 1. Therefore, each calculated error coefficient with value lower than 0.5 implies that the edge will presumably pass also through the pixel adjacent to that being processed, and will have the same coordinate y, but a coordinate x which is increased compared to the previous one. In the case where the error is above or equal to 0.5, the edge will be considered as not passing through the pixel adjacent to that being processed, but as passing through the pixel having coordinates x and y that are increased compared to the previous ones.

In the example of FIG. 5, the algorithm starts with the hypothesis that the start pixel P0 has its center corresponding to the edge E starting point. Therefore, the distance between edge E and pixel center (error coefficient) is null. The algorithm keeps the coordinate y constant, and increases the coordinate x, to pass from the start pixel P0 to the first pixel P1.

The algorithm calculates the distance between the edge E and the first pixel P1 center as the first error coefficient. In the example of FIG. 5, the first error coefficient is equal to 0.25. Being this value below 0.5, the algorithm increases the coordinate x and keeps the coordinate y constant, then going on to process a second pixel P2. The algorithm calculates the distance between the edge E and the second pixel P2 center as the second error coefficient. Such second error coefficient results to be equal to 0.5. Being equal to 0.5, the algorithm increases both the coordinate x and the coordinate y, to pass to a third pixel P3 to be processed. Therefore, the algorithm calculates the distance between the edge E and the third pixel P3 as the third error coefficient. The third error coefficient is equal to −0.25. Being lower than 0.5, the algorithm increases the coordinate x, and keeps the coordinate y constant, to pass to a fourth pixel P4 to be processed. Then, the algorithm calculates the distance between the edge E and the fourth pixel P4 center as the fourth error coefficient, which results to be equal to 0, as the error coefficient of the start pixel P0.

The algorithm continues the calculation operations and the coordinate increment operations, to get to the end pixel PF of the edge E.

Therefore, the rasterizer module 230 results to be capable, by implementing the Bresenham's algorithm, of providing in output information which is representative of the coordinates of the screen pixels to be switched on in order to render the inclined edge E.

The Applicant has noted that the error coefficient between the edge to be rendered and the center of the pixel being processed increases when passing from a pixel to the next one by the same amount which can be defined as an error coefficient increment step. Such coefficient increment step results to be constant for a given inclination. In the example of FIG. 5, such error coefficient increment step is equal to 0.25.

Therefore, based on the determined inclination of the ideal straight line corresponding to the edge E, it is possible to calculate the above-mentioned error coefficient increment step to determine both the coordinates of the pixels to be switched on and the error coefficient for each of the same pixels.

Particularly, the Applicant has also noted that knowing the error coefficient of each pixel, that is, the distance of the edge from the center of the pixel being processed, implies knowing of how much the edge is overlapping the same pixel, and therefore with how much percentage of coverage. Such coverage percentage translates in the possibility of assigning a transparency coefficient to the pixel being processed which is proportional to the coverage percentage.

Therefore, the Applicant has noted the possibility of employing the error coefficient, already calculated by, for example, the Bresenham's algorithm, to determine the coordinates of the pixels to be switched on, but also to implement a rendering method with anti-aliasing technique.

Referring back now to the rendering method 300 of the example of FIG. 4A, it comprises a first step 301 of calculating, based on the determined inclination of the edge E, an error coefficient representative of the distance of the edge E from a center of a pixel P1.

Subsequently, the method 300 comprises the step 302 of associating a transparency coefficient to the pixel P1 based on the calculated error coefficient.

Particularly, the step 302 of associating a transparency coefficient comprises, according to an embodiment, a step 303 of calculating the transparency coefficient based on the error coefficient by employing a shading function, for example, such as shading function of the so-called alpha channel of each pixel, which is present in the graphics module 200. Shading functions of the so-called alpha channel of each pixel are known, and after reviewing the specification, one of skill in the art would know how to use a shading function to calculate the transparency coefficient based on the error coefficient.

In fact, by employing the error coefficient previously calculated as the coefficient of the alpha channel shading function, it is possible to generate a transparency coefficient for each pixel which is proportional to the coverage of the same pixel.

Therefore, the calculating step 303 comprises a step 304 of employing said error coefficient calculated as the shading function coefficient of the alpha channel of said pixel, said shading function coefficient generating said transparency coefficient.

In an alternative embodiment schematically shown in FIG. 4B, the step 302 of associating a transparency coefficient comprises a selecting step 305 of the transparency coefficient from a plurality of transparency coefficients, based on the error coefficient calculated.

Still more particularly, the selecting step 305 of a transparency coefficient comprises the indexing step 306, by the error coefficient, of a memory area (not shown in the Figures) accessible by the graphics module 200. Such memory area is designed to store a mono-dimensional linear gradient of transparency coefficients values (alfa).

For each pixel being processed, an index is generated, as a function of the error coefficient calculated, between 0 and a value representative of the gradient length (for example, 8) to share the corresponding transparency coefficient. This index is employed as an address to access, in the gradient of transparency coefficients values, a linear texture containing a transparency coefficient which, in turn, will be associated to the pixel being processed by a replacing function, such as a replacing function known to those of skill in the art.

Typically, such gradient of transparency coefficients comprises at least eight different texture elements (texels) which represent the different grey gradations to be assigned to the pixels to be switched on in order to render the edge E so as to ensure a rendering which is the least affected by the aliasing effect.

Typically, a graphics engine for the hardware processing of pixels has texture units which can be employed to generate the above-mentioned addresses. For example, each texture unit can calculate the destination address (tx, ty) starting from the coordinates (fx, fy) of the pixel being processed, as reported herein below:

$$[tx, ty] = \begin{bmatrix} \frac{du}{dx} & \frac{du}{dy} \\ \frac{ds}{dx} & \frac{ds}{dy} \end{bmatrix} \cdot \begin{bmatrix} fx \\ fy \end{bmatrix} + [txoffset \ tyoffset]$$

In order to obtain an embodiment of the proposed anti-aliasing technique, the coefficients may be set as follows:

$$\begin{bmatrix} \frac{du}{dx} & \frac{du}{dy} \\ \frac{ds}{dx} & \frac{ds}{dy} \end{bmatrix} = \begin{bmatrix} Err & -1 \\ 0 & 0 \end{bmatrix}$$

$$[txoffset \ tyoffset] = [GRADIENT\_SIZE/2 \ 0]$$

in which

GRADIENT_SIZE=size of the gradient of the transparency coefficients $$Err = \frac{(y1 - y0)}{(x1 - x0)} \text{ with } 0.0 \le Err \le 1.0$$

The thus-calculated index is limited within the range [0; GRADIENT_SIZE-1]. This can be achieved simply by setting the addressing mode to clamp. This approach divides the rendering space into two semi-planes, one above the edge (piano A), and one below the edge (plane B). The plane A is filled in with completely transparent pixels, while the plane B is filled in with opaque pixels. On the contrary, the pixels corresponding to the edge are filled in with a transparency coefficient as specified above.

It shall be noted that the just described embodiment (FIG. 4B) involves the use of a texture unit which is typically present in the graphics module 200 to store the texture of the transparency coefficient.

On the contrary, in the first embodiment (FIG. 4A) it is not necessary to use a texture unit of the graphics module 200, since for the calculation of the transparency coefficient the function shading is directly used of the pixel alpha channel which already is, as stated before, generally in the graphics module 200.

Again, with reference to FIG. 5, it shall be noted that, independently from the embodiment employed, the rendering method 300 allows associating a first transparency coefficient af1 to the third pixel P3 and a seventh pixel P7, a second transparency coefficient af2 to the start pixel P0, the fourth pixel P4, and the end pixel PF, a third transparency coefficient af3 to the first pixel P1 and the fifth pixel P5, a fourth transparency coefficient af4 to the second pixel P2, the sixth pixel P6, and all the other pixels below the edge E.

The first af1, the second af2, the third af3, and the fourth af4 transparency coefficients belong to a gray gradation scale such to render the inclined edge E so that it results to be as much shaded as possible, and so that it has a reduced aliasing effect.

It is pointed out that the rendering method 300 is applied to display a line which, as stated above, can be decomposable into a set of triangles. Particularly, the rendering method 300 will be applied to the edges matching with the line edge and not, for example, to an edge shared by two triangles which falls within the line to be displayed at the edges of a graphics primitive intended to define an object outline.

As it can be seen, the object of one embodiment is fully achieved, since the rendering method allows implementing an anti-aliasing technique by exploiting the information (inclination of the ideal straight line corresponding to an edge to be rendered) previously generated by a rasterization algorithm and frequently already used to render an edge of a graphics primitive.

Furthermore, in addition to advantages from a computational point of view, the rendering method of an embodiment allows considerably reducing the band which is used, since it only requires a quite reduced memory area to store the gradient of transparency coefficients (alfa) to be associated from time to time to the pixels being processed by the graphics module.

Finally, considering that it operates on edge-type graphics entities, the described rendering method results to be rather versatile and flexible to be able to be advantageously implemented in bidimensional (2D) or tridimensional (3D) graphics applications.

Again, forasmuch as the method of an embodiment exploits information already provided by a rasterization algorithm frequently used to generate the coordinates of the pixels to be switched on in order to display the inclined edge, the described rendering method allows reducing the aliasing effect to a cost, both from a software point of view and also from the hardware point of view, which is rather reduced compared to the known rendering methods, for example, the MSAA method and the FSAA method.

To the above-described embodiments of the method, those of ordinary skill in the art, in order to meet contingent needs, will be able to make modification, adaptations, and replacements of elements with functionally equivalent other ones, without departing from the scope of the following claims. Each of the characteristics described as belonging to a possible embodiment can be implemented independently from the other embodiments described.

Some embodiments may take the form of computer program products. For example, according to one embodiment there is provided a computer readable medium comprising a computer program adapted to perform one or more of the methods described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the systems and/or modules may be implemented or provided in other manners, such as at least partially in firmware and/or hardware, including, but not limited to, one or more application-specific integrated circuits (ASICs), discrete circuitry, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology. In some embodiments, some of the modules or controllers separately described herein may be combined, split into further modules and/or split and recombined in various manners.

The systems, modules and data structures may also be transmitted as generated data signals (e.g., as part of a carrier wave) on a variety of computer-readable transmission mediums, including wireless-based and wired/cable-based mediums.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
using at least one processing device to:
determine, based on an inclination of an edge of a graphics primitive relative to one of two reference directions of a screen, an error coefficient representative of a distance along one of the reference directions of the screen of said edge from a center of a pixel of the screen;
associate a transparency coefficient to said pixel, based on said error coefficient; and
select a subsequent pixel to process based on the error coefficient of the pixel.

2. The method according to claim 1 wherein the associating step of a transparency coefficient comprises determining said transparency coefficient based on said error coefficient.

3. The method according to claim 2 wherein determining the transparency coefficient comprises employing said error coefficient as a shading function coefficient of an alpha channel of said pixel.

4. The method according to claim 1 wherein the associating step of a transparency coefficient comprises a selecting step of said transparency coefficient from a plurality of transparency coefficients, based on said error coefficient.

5. The method according to claim 4 wherein the selecting step of a transparency coefficient comprises an indexing step, by said error coefficient, of a memory area so arranged as to store a linear gradient of transparency coefficients values.

6. A graphics device, comprising:
geometry processing circuitry;
a rasterizer coupled to the geometry processing circuitry and configured to:
calculate, based on an inclination of an edge of a graphics primitive relative to one of two reference directions, an error coefficient representative of a distance, along one of the two reference directions, of the edge from a center of a pixel; and
associate, based on the calculated error coefficient, a transparency coefficient to said pixel; and
pixel processing circuitry coupled to the rasterizer and configured to select a subsequent pixel to process based on the error coefficient.

7. The graphics device of claim 6 wherein the raterizer is configured to calculate the transparency coefficient based on the calculated error coefficient.

8. The graphics device of claim 7 wherein calculating the transparency coefficient comprises employing the calculated error coefficient as a shading function coefficient of an alpha channel of the pixel.

9. The graphics device of claim 6 wherein the raterizer is configured to select, based on the calculated error coefficient, the transparency coefficient from a plurality of transparency coefficients.

10. The graphics device of claim 9, further comprising a memory storing a linear gradient of transparency coefficient values, wherein the raterizer is configured to select the transparency coefficient using an index of the stored gradient of transparency coefficient values to a set of calculated error coefficients.

11. A graphics system, comprising:
a memory; and
a graphics rendering device configured to:
calculate, based on an inclination of an edge of a graphics primitive relative to one of two reference directions, an error coefficient representative of a distance, along one of the two reference directions, of the edge from a center of a pixel;
associate, based on the calculated error coefficient, a transparency coefficient to said pixel; and
select, based on the calculated error coefficient, a subsequent pixel.

12. The graphics system of claim 11, comprising a central control unit wherein the graphics rendering device is part of the central control unit and the memory is coupled to the central control unit.

13. The graphics system of claim 12, further comprising a display coupled to the central control unit.

14. The graphics system of claim 12 wherein the central control unit comprises a central processing unit coupled to the graphics rendering unit.

15. The graphics system according to claim 14, further comprising a mass memory storage device operatively connected to the central control unit, said mass memory storage device being arranged for the storage of images to be represented on a displaying screen.

16. The graphics system according to claim 14, further comprising a positioning module operatively connected to the central control unit, said positioning module being arranged information to provide to the central control unit which is representative of a position of the graphics system.

17. The graphics system according to claim 14, further comprising an application module operatively connected to said graphics rendering device, said application module being configured to provide information to the graphics rendering device which is representative of a scene to be rendered.

18. The graphics system according to claim 17, further comprising a frame buffer operatively connected to said graphics rendering device, said frame buffer being arranged to store information representative of a color of each pixel of a displaying screen.

19. The graphics system according to claim 14 wherein the graphics system is one or more of:
a satellite navigator;
a set-top box;
a mobile telephone;
a palmtop PDA;
a terrestrial digital receiver;
a DVIX player;
an MP3 player;
a personal computer; and
a gaming machine.

20. The graphics system of claim 14 wherein the graphics system is a PS3 playstation.

21. A non-transitory computer-readable medium whose contents cause at least one controller to perform a method, the method comprising:
calculating, based on an inclination of an edge of a graphics primitive relative to one of two reference directions, an error coefficient representative of a distance, along one of the reference directions, of the edge from a center of a pixel;
associating, based on the calculated error coefficient, a transparency coefficient to the pixel; and
determining a coordinate of a subsequent pixel based the calculated error coefficent.

22. The non-transitory computer-readable medium of claim 21 wherein the associating comprises calculating the transparency coefficient based on the calculated error coefficient.

23. The non-transitory computer-readable medium of claim 22 wherein calculating the transparency coefficient comprises employing the calculated error coefficient as a shading function coefficient of an alpha channel of the pixel.

24. The non-transitory computer-readable medium of claim 21 wherein the associating comprises selecting, based on the calculated error coefficient, the transparency coefficient from a plurality of transparency coefficients.

25. The non-transitory computer-readable medium of claim 24 wherein the selecting comprises using an index based on the calculated error coefficients to retrieve the transparency coefficient from a set of gradient of transparency coefficient values stored in a memory.

26. A device, comprising:
   means for calculating, based on an inclination of an edge of a graphics primitive relative to one of two reference directions of a screen, an error coefficient representative of a distance, along one of the reference directions, of the edge from a center of a pixel;
   means for associating, based on the calculated error coefficient, a transparency coefficient to the pixel; and
   means for selecting a subsequent pixel to process based on the error coefficient.

27. The device of claim 26 wherein the means for associating is configured to calculate the transparency coefficient based on the calculated error coefficient.

28. The device of claim 27 wherein calculating the transparency coefficient comprises employing the calculated error coefficient as a shading function coefficient of an alpha channel of the pixel.

29. The device of claim 26 wherein the means for associating is configured to select, based on the calculated error coefficient, the transparency coefficient from a plurality of transparency coefficients.

30. The device of claim 29, further comprising a memory storing a linear gradient of transparency coefficient values, wherein the means for associating is configured to select the transparency coefficient using an index of the stored gradient of transparency coefficient values to a set of calculated error coefficients.

31. The device of claim 26 wherein the device is operable as one or more of the following:
   a satellite navigator;
   a set-top box;
   a mobile telephone;
   a palmtop PDA;
   a terrestrial digital receiver;
   a DVIX player;
   an MP3 player;
   a personal computer; and
   a gaming machine.

32. The device of claim 26 wherein the means for selecting a subsequent pixel to process is configured to determine pixel coordinates of the subsequent pixel to process based on the error coefficient.

33. The device of claim 32 wherein the means for selecting a subsequent pixel to process is configured to selectively increment a pixel coordinate based on a comparison of the error coefficient to an error coefficient threshold.

34. The device of claim 26, further comprising:
   means for switching at least the pixel and the subsequent pixel on to render the edge on the screen.

35. The method of claim 1 wherein the selecting a subsequent pixel comprising selectively incrementing a pixel coordinate based on whether the error coefficient is less than a threshold value.

36. The method of claim 35 wherein the pixel and the subsequent pixel are pixels used to render an image of the edge on the screen.

37. The method of claim 35 wherein the threshold value is 0.5.

38. The graphics device of claim 6 wherein the pixel processing circuitry is configured to selectively increment a pixel coordinate of one of the reference directions based on the error coefficient.

39. The graphics system of claim 13 wherein the reference directions are reference directions of the screen.

40. The graphics system of claim 11 wherein the graphics rendering device is configured to selectively increment a pixel coordinate with respect to one of the reference directions based on the error coefficient.

* * * * *